Sept. 29, 1959 V. E. RETTIG 2,906,083
GATHERING AND SNAPPING STRUCTURE FOR A CORN HARVESTER
Filed Dec. 31, 1956
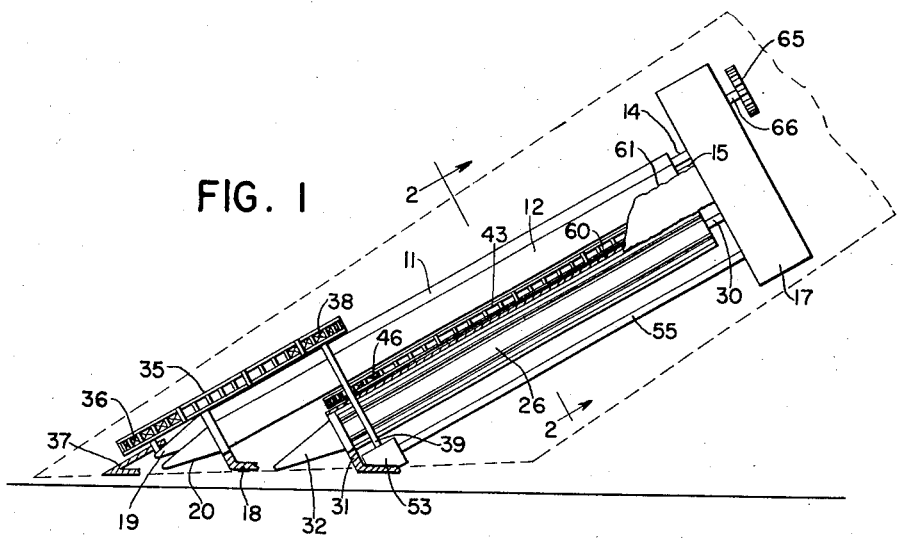
INVENTOR.
VERNON E. RETTIG
ATTORNEYS United States Patent Office 2,906,083
Patented Sept. 29, 1959

2,906,083

GATHERING AND SNAPPING STRUCTURE FOR A CORN HARVESTER

Vernon E. Rettig, Ankeny, Iowa, assignor, by mesne assignments, to Deere & Company, a corporation of Delaware Application December 31, 1956, Serial No. 631,666

4 Claims. (Cl. 56—111)

This invention relates to a corn picker and more particularly to the harvesting mechanism in the corn harvester.

The harvesting mechanism of conventional type corn pickers presently being used comprises basically a pair of fore-and-aft extending snapping rolls transversely spaced apart to form a stalk passage. The harvester is provided with a mobile frame which moves the harvesting mechanism over the field so that the stalks are successively fed into the stalk passage. The rotating rolls operate to draw the stalks downwardly until the ears contact the rolls and are snapped or detached from the stalks. Provided immediately above the snapping rolls is a chain having lugs projecting over the stalk passage for the purpose of moving the stalks and the detached ears upwardly and rearwardly to an ear conveyor. Inasmuch as the snapping rolls must draw the stalks downwardly, there is normally provided on the rolls a type of rib or lug which bight into the stalks to more aggressively drive the stalks through the snapping rolls.

One of the greater problems encountered with this type of harvesting mechanism is that ears of corn falling on both the lugs on the chains and on the ribs or lugs on the snapping rolls will cause some degree of shelling to occur. Also, in many instances the ears of corn will become momentarily lodged in some part of the harvesting mechanism, and the action of the chain lugs and the ribs on the snapping rolls will often cause a considerable amount of shelling before the ears become dislodged. In either case, there is created a quantity of premature shelled corn which in most corn harvesters serves as a source of revenue loss inasmuch as no provision is made to collect the shelled corn and it is lost on the ground.

It is therefore the primary object of this invention to provide a new and novel harvesting mechanism in which snapping rolls and lug chains are used for the purposes as above described, but in which other mechanism is provided which prevents the ears of corn from coming into contact with either the ribs or with the lugs on the chain.

It is also an object of this invention to provide a chain having lugs extending across the stalk passage. The lugs are supported vertically by means on an elongated plate member, the upper surface of which serves as a guide on which the terminal ends of the lugs may slide.

Other objects and advantages of the invention will become apparent to those skilled in the art as the nature of the invention is better understood from the following description as illustrated in the accompanying drawings.

Fig. 1 is a side elevation and partial sectional view of the harvesting mechanism which incorporates the features of the present invention.

Fig. 2 is a sectional view taken along the lines 2—2 of Fig. 1.

Fig. 3 is an enlarged perspective view showing a chain link and lug and its associated guide plate.

The corn picker, illustrated only by the harvesting mechanism, may be of any conventional type, and may be either tractor-mounted, drawn, or self-propelled. The general outline of the corn picker is shown in dotted representation in Fig. 1 and for purposes of basic description the picker may be described as having a mobile supporting frame movable forwardly over a row planted field to successively receive corn stalks of a row into the harvesting mechanism. Typical of corn harvesters of this type is shown in U.S. Patent 2,622,382, issued to W. E. Slavens December 23, 1952.

The harvesting mechanism comprises a first or upper pair of fore-and-aft extending snapping elements or rolls 11, 12 transversely spaced apart to form a fore-and-aft extending stalk passage 13. The surface of the rolls 11 and 12 are smooth and are normally spaced apart sufficiently that the surface of the rolls will have little effect on the stalks passing between them relative to their ability to aggressively engage the stalks. The snapping rolls 11 and 12 are supported on shafts 14, 15, the rear ends of which extend into a gear housing 17. The forward ends of the snapping rolls 11 and 12 are supported on frame structure 18 which is suitably fixed to the main supporting structure of the harvester. The snapping rolls 11 and 12 have forwardly extending cone-shaped ends 19 and 20 respectively which serve the purpose of guiding the stalks into the passage 13.

A second pair of fore-and-aft extending rolls 25, 26 are positioned respectively on opposite sides of the passage 13 and spacedly beneath the first or upper pair of rolls 11, 12. The rolls 25, 26 are provided with radially extending ribs 27, 28 respectively, the purpose of which is to aggressively and positively engage the stalks passing through the passage 13 and to draw the stalks downwardly beneath the harvesting mechanism. The rolls 25, 26 are supported on rearwardly extending shafts, the shaft supporting the left roll 26 being indicated by the reference numeral 30, the rear ends of which extend into the gear housing 17. The forward ends of the rolls 25, 26 are supported on frame structure 31 which is fixed to the main supporting structure of the harvester. The rolls 25, 26 are pointed, as at 32, for the purpose of feeding the stalks rearwardly into the passage 13.

Positioned above and at the forward end of the snapping rolls 11, 12 are a pair of forwardly extending gathering chains, as indicated at 35, which flare outwardly at the forward end of the harvester in conventional manner for the purpose of gathering into the harvester grounded ears and bent over stalks. The gathering chains 35 are conventional, reference being made to the aforesaid Slavens patent for more detailed information concerning them. The gathering chains are carried at their forward end by idler sprockets 36, which are carried by frame structure 37 fixed to the main supporting structure of the harvester. The gathering chains are driven from the rear by drive sprockets 38 mounted on upright drive shafts 39.

Positioned in the space between the first or upper rolls 11 and 12 and the lower or second rolls 25, 26 is an endless flexible element or chain 42 having a fore-and-aft extending section or run 43 positioned at one side of and adjacent to the passage 13 (Fig. 2). The chain 42 is provided with outwardly projecting lugs 44, part of which extend transversely from the inner run 43 across the passage 13 and have their terminal ends 45 on the opposite side of the stalk passage 13 than the run 43. The chain 42 is driven from its forward end by means of a sprocket 46 mounted on one of the aforesaid upright drive shafts 39. For purpose of clarification it may be noted that the upright drive shaft on the right of the passage drives both the forward gathering chain and the chain 42 while the upright drive shaft 39 on the left of the stalk passage 13 drives only the gathering chain on the left forward end of the harvester, this being obvious inasmuch as the lug chain 42 is only on the right side of the stalk passage 13. The rear end of the chain 42 is idled over a sprocket 47 carried on a shaft 48 which in turn is supported by a forwardly extending bracket 49 having a rear upright section 50 welded to the front face of the gear housing 17.

An elongated plate member is positioned to the left of the stalk passage 13 and between the upper roll 12 and the lower roll 26. The plate 60 may be an integral part of styling 61 or may in any other suitable manner be fixed to the styling or other type of support in the harvester. The edge 62 of the plate 60 lying proximate to the stalk passage 13 extends inwardly beyond the outer or terminal end 45 of the lugs 44 and beneath the lower edge of the lugs 44 so that the upper surface of the plate 60 will provide a sliding surface for the lower outer edges of the lugs.

Driving mechanism is provided within the gear housing 17 and is driven from an outside source by means of a sprocket 65 mounted on an input shaft 66. The driving mechanism within the housing 17 comprises a suitable arrangement of gears and chain drives so that the upper rolls 11 and 12, and the lower rolls 25, 26 will rotate in a manner that their adjacent surfaces move downwardly and also, so that the inner run 43 of the chain 42 will move from front to rear. Details of the gears and chain drives within the housing 17 are not deemed necessary for purposes of this invention inasmuch as a suitable arrangement could be arrived at by any one skilled within the art.

The harvesting mechanism operates in the following manner. The lower rolls 25, 26 will be aggressive and will bight into the stalks passing through the passage 13 so that the stalks will move downwardly. The upper rolls 11 and 12 will serve only as snapping means or elements and will operate to detach the ears of corn from the stalks only through the aggressive effort of the lower rolls 25, 26. It may be noted at this point that while the upper rolls are driven in the specific instance described for purposes of clearing trash, it is quite possible that the rolls 11, 12 could be idled whereby the only force causing them to rotate would be the frictional force created by the stalks moving downwardly between them. This latter type of mounting would also give the added advantage of having no moving surface adjacent to the ears of corn should they become lodged or stuck in the styling or other structure in the harvesting mechanism. Inasmuch as the rolls 11, 12 are smooth, however, it is felt that the rolls may be rotated with negligible shelling effect on the ears of corn.

As the stalks are drawn downwardly between the snapping elements or rolls 11, 12 the lugs 44 will engage the stalks and move them rearwardly substantially in timed relation to the harvester moving forwardly over the field. It may be noted that inasmuch as the lower edge of the lugs 44 engage the upper surface of the plate 60, there is no way in which the stalks may escape the conveying effect of the lugs 44.

By providing the smooth upper rolls 11 and 12, there will be no lugged or ribbed rolls which will come into contact with the ears of corn, thereby eliminating premature shelling of corn which normally occurs due to contact of the ears with the ribs or lugs on the normal type of snapping rolls. Also by providing the smooth rolls 11 and 12 above the chain 42, the rolls will prevent the ears of corn from engaging the lugs 44, thereby eliminating the possibility of the ears being prematurely shelled through engagement with the chain lugs. Therefore, it may be seen that through this type of harvesting mechanism the aggressive action of the rotating rolls and the lugs on the chains which is common in former models of corn harvester is also maintained in this present harvester. However, due to the smooth rolls 11, 12 being positioned above the chain lugs 44 and the aggressive rolls 25, 26 the possibility of premature shelling of corn is substantially reduced.

While only one form of the invention has been shown, other forms and variations will undoubtedly occur to those skilled in the art. Therefore it should be understood that details of the harvester have been set forth for the purpose of clearly and concisely illustrating the principles of the invention, and there is no intention to limiting the invention to the exact details but to the broad general principles herein claimed.

What is claimed is:

1. Harvesting mechanism for a corn harvester having a mobile supporting frame movable forwardly over a row-planted field to successively receive corn stalks of a row into the harvester, comprising: a first pair of fore-and-aft extending snapping rolls having substantially smooth peripheral surfaces and transversely spaced apart to form a fore-and-aft extending stalk passage, said rolls being spaced sufficiently to permit relative free passage of the stalks and to prevent passage of the ears; a second pair of fore-and-aft extending rolls positioned respectively on opposite sides of the passage and spacedly beneath the first pair of rolls and operative to draw the stalks downwardly between the first pair of rolls to effect detachment of the ears from the stalks by the first pair of rolls; an endless flexible element having a fore-and-aft extending section between the first and second pairs of rolls and movable from front to rear, said section being positioned adjacent to and at one side of the passage and having transversely extending lugs extending across said passage and terminating on the opposite side of the passage; lug supporting means on the opposite side of the passage for vertically supporting the terminal ends of the lugs; and means driving the flexible element to cause the lugs to move stalks in the passage rearwardly as the rolls detach the ears from the stalk.

2. Harvesting mechanism for a corn harvester having a mobile supporting frame movable forwardly over a row-planted field to successively receive corn stalks of a row into the harvester, comprising: a first pair of fore-and-aft extending snapping rolls having substantially smooth peripheral surfaces and transversely spaced apart to form a fore-and-aft extending stalk passage, said rolls being spaced sufficiently to permit relative free passage of the stalks and to prevent passage of the ears; a second pair of fore-and-aft extending rolls positioned respectively on opposite sides of the passage and spacedly beneath the first pair of rolls and operative to draw the stalks downwardly between the first pair of rolls for effecting detachment of the ears from the stalks by the upper rolls; an endless flexible element having a fore-and-aft extending section between the first and second pairs of rolls and movable from front to rear, said section being positioned adjacent to and at one side of the passage and having transversely extending lugs extending across said passage; and means driving the flexible element to cause the lugs to move stalks in the passage rearwardly as the rolls detach the ears from the stalk.

3. Harvesting mechanism for a corn harvester having a mobile supporting frame movable forwardly over a row-planted field to successively receive corn stalks of a row into the harvester, comprising: a pair of fore-and-aft extending snapping rolls having substantially smooth peripheral surfaces and transversely spaced apart to form a fore-and-aft extending stalk passage, said rolls being spaced sufficiently to permit relative free passage of the stalks and to prevent passage of the ears; an endless flexible element having a fore-and-aft extending section beneath the rolls and movable from front to rear, said section being positioned adjacent to and at one side of the passage and having transversely extending lugs extending across said passage and terminating on the opposite side of the passage; lug supporting means on the opposite side of the passage for vertically supporting the terminal ends of the lugs; means driving the flexible element to cause the lugs to move stalks in the passage rearwardly as the rolls detach the ears from the stalk; and means effecting downward movement of the stalks to cause detachment of the ears by the snapping rolls.

4. Harvesting mechanism for a corn harvester having a mobile supporting frame movable forwardly over a row-planted field to successively receive corn stalks of a row into the harvester, comprising: a pair of fore-and-aft extending snapping rolls having substantially smooth peripheral surfaces and transversely spaced apart to form a fore-and-aft extending stalk passage, said rolls being spaced sufficiently to permit relative free passage of the stalks and to prevent passage of the ears; an endless flexible element having a fore-and-aft extending section beneath the pair of rolls and movable from front to rear, said section being positioned adjacent to and at one side of the passage and having transversely extending lugs extending across said passage; means on the frame drawing the stalks downwardly for effecting detachment of the ears from the stalks; and means driving the flexible element to cause the lugs to lead the stalks in the passage rearwardly as the rolls detach the ears from the stalk.

References Cited in the file of this patent

UNITED STATES PATENTS

| | | |
|---|---|---|
| 876,189 | Ingersoll | Jan. 7, 1908 |
| 2,219,483 | Lukes | Oct. 29, 1940 |
| 2,229,628 | Anderson | Jan. 28, 1941 |
| 2,234,447 | Norman | Mar. 11, 1941 |
| 2,651,163 | Aasland | Sept. 8, 1953 |
| 2,665,538 | Andrews | Jan. 12, 1954 |